US012724269B2

(12) United States Patent
Sezer

(10) Patent No.: US 12,724,269 B2
(45) Date of Patent: Sep. 1, 2026

(54) INCREASED OPTICAL PERFORMANCE OF HEAD-MOUNTED DISPLAYS INSIDE LASER SAFETY EYEWEAR

(71) Applicant: Innotonix GMBH, Vienna (AT)

(72) Inventor: Ugur Sezer, Vienna (AT)

(73) Assignee: Innotonix GMBH, Vienna (AT)

(*) Notice: Subject to any disclaimer, the term of this patent is extended or adjusted under 35 U.S.C. 154(b) by 357 days.

(21) Appl. No.: 18/266,306

(22) PCT Filed: Dec. 9, 2020

(86) PCT No.: PCT/EP2020/085190
§ 371 (c)(1),
(2) Date: Jun. 9, 2023

(87) PCT Pub. No.: WO2022/122145
PCT Pub. Date: Jun. 16, 2022

(65) Prior Publication Data

US 2024/0045211 A1 Feb. 8, 2024

(51) Int. Cl.
*G02B 27/01* (2006.01)

(52) U.S. Cl.
CPC ................................ *G02B 27/0172* (2013.01)

(58) Field of Classification Search
CPC ......... G02B 27/01–2027/0198; H04N 5/7491; G02C 7/104; B23K 9/322
(Continued)

(56) References Cited

U.S. PATENT DOCUMENTS 9,261,688 B2 2/2016 Takeda et al.
9,366,862 B2 6/2016 Haddick et al.
(Continued)

FOREIGN PATENT DOCUMENTS

CA 2828407 9/2012
CN 102692706 A 9/2012
(Continued)

OTHER PUBLICATIONS

International Search Report issued for International Patent Application No. PCT/EP2020/085190, dated Jul. 28, 2021.
(Continued)

*Primary Examiner* — Jessica M Merlin
(74) *Attorney, Agent, or Firm* — Bradley Arant Boult Cummings LLP; Henry B. Ward, III

(57) ABSTRACT

Protective eyewear system for protection of the eyes of a user against harmful radiation, in particular laser light, welding arc, comprising: a laser-safe head-mounted support with an attachment system to the head; a pair of safety lenses selected to block or weaken the harmful radiation, said pair of safety lenses being attached to or included in the laser-safe head-mounted support; a processing element, the laser-safe head-mounted support comprising said processing element, the processing element being configured to generate a video projection signal; a video projection system configured to provide a real-world image; the video projection system comprising a light guide system to be worn so as to cover the eyes of the user; the processing element configured to generate a video projection signal to be overlaid with the real image, the video projection signal is coupled into the light-guide system; wherein the light guide system comprises at least two planar and parallel surfaces, and wherein the light guide system and/or the video projection system comprise one or more non-axial symmetric curved surfaces.

19 Claims, 8 Drawing Sheets

10

(58) Field of Classification Search
USPC ......... 345/7–9; 348/115; 349/11; 359/13–14, 359/629–633
See application file for complete search history.

(56) References Cited

U.S. PATENT DOCUMENTS

| | | | | |
|---|---|---|---|---|
| 10,126,553 | B2 * | 11/2018 | Poulos | G06T 19/006 |
| 10,330,934 | B2 | 6/2019 | Takeda et al. | |
| 10,497,161 | B1 * | 12/2019 | Jones | G06T 11/00 |
| 2011/0248904 | A1 * | 10/2011 | Miyawaki | G09G 3/003 345/7 |
| 2012/0236031 | A1 | 9/2012 | Haddick et al. | |
| 2012/0243102 | A1 * | 9/2012 | Takeda | G02B 6/003 359/630 |
| 2014/0177063 | A1 * | 6/2014 | Wang | G02B 27/0172 359/630 |
| 2016/0116744 | A1 | 4/2016 | Takeda et al. | |
| 2016/0246055 | A1 * | 8/2016 | Border | G02B 27/0172 |
| 2017/0219830 | A1 | 8/2017 | Komatsu et al. | |
| 2018/0126476 | A1 * | 5/2018 | Meess | G05B 19/182 |
| 2020/0357183 | A1 * | 11/2020 | Weber | G06F 3/013 |

FOREIGN PATENT DOCUMENTS

| | | | |
|---|---|---|---|
| CN | 108057938 | A | 5/2018 |
| CN | 207851422 | U | 9/2018 |
| CN | 108700741 | A | 10/2018 |
| CN | 109932821 | A | 6/2019 |
| JP | 2016130838 | A | 7/2016 |

OTHER PUBLICATIONS

Written Opinion issued for International Patent Application No. PCT/EP2020/085190, dated Jul. 28, 2021.

Notification of the First Office Action issued by the China National Intellectual Property Administration in corresponding Chinese Patent Application No. 202080108394.6 on Mar. 31, 2026, 20 pages including English translation.

Communication pursuant to Article 94(3) EPC issued by the European Patent Office in corresponding European Patent Application No. 20823779.2-1001 on Mar. 30, 2026, 7 pages.

* cited by examiner

INCREASED OPTICAL PERFORMANCE OF HEAD-MOUNTED DISPLAYS INSIDE LASER SAFETY EYEWEAR

FIELD OF THE INVENTION

The present invention relates to the field of protective eyewear for protection of the eyes of a user against harmful radiation, for example laser light, welding arc.

BACKGROUND OF THE INVENTION

Problem

There are many attempts trying to merge eye protection with augmented/virtual reality. Some of them describe methods or instruments on how laser safety glasses may contain a display apparatus for viewing the surrounding or the laser beam over cameras and also overlay digital information. See, for example U.S. Ser. No. 10/197,816B2 and US2018/0172996A1.

However, many of these attempts do not tackle problems and issues that may arise while introducing augmented reality, AR, or virtual reality, VR, technology into the area of laser safety. Especially optical performance including optical clarity and optical correctness, visible light transmission and color fidelity are crucial aspects of personal eye protection equipment. While many documents generally disclose a display apparatus it is the shape, material and alignment of the display apparatus as well as the types and characteristics of the cameras that has to be fitted to laser safety regulations to ensure correct protection and optimum wearing comfort for the user.

Further problems might include the following issues:

Peripheral Sight

Personal protective eyewear should be comfortable and sufficient peripheral vision should be ensured.

Optical Clarity and Correctness

One of the key components, e.g., for EN Standard and beyond, with respect to protective eyewear is the issue of optical clarity or correctness. The highest level of correctness is Class 1, i.e. 0.06 dioptres (0.06/m). A common reason for workers not wearing their protective eyewear is poor optical clarity, which produces distortion of the work area. Optical clarity is a perceptual expression denoting the absence of light diffusion and image distortion due to optical aberrations in the lens. Light diffusion, commonly known as haze, results from small-angle light scattering at imperfections and impurities in the lens material and lens coating, as well as scratches and fog on the lens. As a consequence, the brain needs to make significant background compensation, leading to eyestrain, fatigue and loss of productivity, especially when the eyewear needs to be worn for extended periods of time.

Visible Light Transmission (VLT)

Using laser protection glasses or a laser protection window, individual wavelengths or ranges may be filtered out from the spectrum that would otherwise hit the eye. If light is blocked from the visible area, this immediately leads to a change in the perception of the surroundings. On the one hand, the optical density of the filter, i.e. low transmission, may make the surroundings darker. This may be compared to looking through sunglasses, which would provide a similar effect. On the other hand, the lack of individual wavelengths or ranges typically changes the color vision of the user. If the resulting VLT value is less than 20%, additional lighting should be provided at the workplace, e.g. according to the EN standard, e.g. eye fatigue. With low VLT and poor lighting, it can be assumed that the eye is adjusting to the so-called night vision. This may reduce the color perception and the spectral sensitivity for the eye thus may shift to the shorter wavelength range.

Color Fidelity

The human eyes can adapt to different light situations and the total amount of light can be balanced by additional illumination. Therefore, another important aspect for the selection of a laser safety filter is color vision. If color vision is impaired or restricted, some colors may not be recognized. This effect may also apply to warning lights or displays, or the ability to distinguish between instruments or vessels marked by color such as those found in medical surroundings.

SUMMARY OF THE INVENTION

In view of the above, the present invention provides a solution to mitigate or even avoid the above-mentioned limitations and problems. In the following invention, a digital laser safety goggle with laser safety lenses in combination with an independent see-through video projection system for augmenting reality is proposed. The material, shape and alignment of this display apparatus in combination with particular cameras for viewing the surrounding as well as its features are the content of the claims. These will tackle the problems, which may arise when combining a video projection system with laser safety and will mainly focus on guaranteeing high optical performances as required by many safety regulations.

The present invention provides: A protective eyewear system for protection of the eyes of a user against harmful radiation, in particular laser light, welding arc, comprising: a laser-safe head-mounted support with an attachment system to the head; a pair of safety lenses selected to block or weaken the harmful radiation, said pair of safety lenses being attached to or included in the laser-safe head-mounted support; a processing element, the laser-safe head-mounted support comprising said processing element, the processing element being configured to generate a video projection signal; a video projection system configured to provide a real-world image; the video projection system comprising a light guide system to be worn so as to cover the eyes of the user; the processing element configured to generate a video projection signal to be overlaid with the real image, the video projection signal is coupled into the light-guide system; wherein the light guide system comprises at least two planar and parallel surfaces, and wherein the light guide system and/or the video projection system comprise one or more non-axial symmetric curved surfaces.

Here it should be understood that while laser light or welding arc may be the two most prominent types of harmful radiation, other types of radiation might be encompassed by that term, as well.

Here it should further be understood that the safety lenses or filter lenses should be considered to be analog filter lenses, which are necessary to ensure laser safety. In contrast, in the following the phrase “digital laser safety glasses” or “digital laser goggles” may be used, referring to the entire system, i.e. laser safety lenses, laser-safe head-mounted support, processing element, optical system and light guide system. Here, “digital” should refer to everything except conventional laser safety glasses.

Here, a video projection system generates a video projection signal that is coupled into the light-guide systems over projection lenses. This video projection signal is a virtual image. The virtual image is then overlaid to the real-world image in the light guide system.

An attachment system to the head may also be understood as a head mounting for the user. The user may also be referred to as the operator of the equipment.

Here, a transparent display and a light guide should eliminate unwanted optical magnification, e.g. a diopter of 0. Protective eyewear should exhibit optical correctness and optical clarity, which for example may be one of the key components of the standards. In general, as the diopter level drops the degree of clarity increases. The video projection system may include a light guide member consisting of surfaces that face each other. These surfaces may be flat and parallel to each other to eliminate unwanted diopter. Using a light guide and display design that eliminates diopter may also be important for laser safety for the following reasons:

- Light from objects going through the light guide and/or display may be (de-)focused so that real-world objects appear magnified. This may lead to misperception of the environment so that hazardous obstacles/objects might not be seen and prevented well. This may thus pose a safety risk.
- The (de-)magnification might influence the depth perception of the user leading to safety risk. When aligning the laser, a wrong depth perception may cause serious damage to the user's body. When using lasers in dentistry or surgery, a wrong depth perception may lead to mistreatment of the patient and failure of the surgery.
- A potential diopter caused by the AR display or light guide may cause many symptoms on the user, e.g. eye strain, eye fatigue, headache, irritation eyes, blurry vision, which will decrease his/her concentration and might even lead to a habit of taking-off the laser safety goggles while working with dangerous laser light.
- An unwanted diopter may also (de-)magnify the virtual image leading to misconception of the displayed image. This may be especially problematic, in case the virtual image is taken as a guide or reference for the real-world work, e.g. laser alignment or laser assisted surgery.
- An unwanted diopter of the AR display or light guide that partially covers the eye may lead to view distortion when moving eyes, e.g. a central part of the vision is magnified differently than the edges.

In the protective eyewear system as described above, wherein the light guide system may include a semi-transparent reflective surface for visible light such that the video projection signal and the real-world image can be overlapped and displayed directly to the eyes of the user when wearing the protective eyewear system.

In the protective eyewear system as described above, the light guide system may further include at least one semi-transparent reflective surface, wherein the opacity of the half-mirror may be electrically adaptable to a contrast between video projection signal and light conditions of ambient light and/or the harmful radiation.

Here, one possibility might be that the mirrors are known "silver" mirrors. Since the eye may only perceive visible wavelengths, it is sufficient that this mirror is half-reflective or half-transmittive to visible wavelengths. Here, visible wavelengths refer to the spectrum of wavelengths of light visible to human perception by human eyes. In general, the visible spectrum or visible light may refer to light, i.e. electromagnetic radiation with a wavelength from a range of wavelengths between roughly 400 nm and 800 nm (0.4-0.8 μm).

Here, it should be understood that the video projection system might have multiple surfaces. At least one of these surfaces may be a semitransparent mirror. In a light guide with a semitransparent mirror, the light from the display may experience multiple internal total reflections before hitting the semitransparent mirror that will eventually reflect the image into the eye of the observer. Thereby, the overall size of the optical system may be reduced. Further, a high image quality and high field-of-view (FOV) may be maintained. In general, the optical quality and efficiency in partial-reflector based AR glasses are higher than in grating based light guides, e.g. waveguides etc.

In combination with laser safety glasses, such half-mirrors, i.e. semitransparent mirrors may bring the following advantages:

- When using AR content or virtual images, a problem may occur that the brightness of the surroundings as visible through the laser safety glasses may hamper a correct vision of the virtual image. In an effort to "dim" the surrounding, the half-mirror film may be made more opaque in order to achieve a better visibility of the AR content. This can be very helpful when using very intense laser light.
- The half-mirror film may also be periodically switched from transparent to a certain degree of haze so that the user is enabled to compare the virtual image with the real-world vision.

In the protective eyewear system as described above, a brightness sensor may be placed within the laser-safe head-mounted support in order to regulate the opacity of the at least one semi-transparent reflective surface automatically.

In the protective eyewear system as described above, the brightness sensor may be configured to regulate the illumination of the video projection signal displayed to the eyes and to control the color temperature of the video projection system.

As mentioned, above, different laser filter glasses can have different VLT. Thus, the brightness inside the laser goggle might change. To adapt to different VLT, a brightness sensor may be placed inside the laser safety goggle to monitor VLT and to adjust the display brightness. The brightness sensor might then also change the color temperature of the video projection system to shorter wavelengths, as in dark environments the eyes are more sensitive in this spectral region.

In the protective eyewear system as described above, the at least one semi-transparent reflective surface may be configured to act as a neutral density filter.

In the protective eyewear system as described above, the position of the light guide system, processing element as well as the video projection system as a whole system may be alignable with respect to the user's eye.

Here "alignable" should be understood as that it is possible to align these elements. The eye should be the major reference as soon as the laser-safe head mounted support "touches" the face/skin of the user, i.e. when it is worn by the user. Thus, one should make sure that the laser goggle/lens "sits" well and "touches" the skin of the face. However, one may use an elastic band or a system, which can be made tighter.

Here, the position of the light guide system, processor unit as well as the video projection system as a whole may be aligned with respect to the user's eye. This might be achieved through gearwheels and/or knobs situated on the outside of the head mounted support.

In general, the alignment of the optical system of the video projection system with respect to the used laser safety lenses may be important to minimize diopter, beam displacement and also occurring off-axis aberrations. A misalignment might lead to image distortion and eye strain decreasing the comfort of such a digital laser safety goggle. Thus, positioning, i.e. pitch, yaw & roll as well as xyz and interpapillary distance, of augmented reality glass or see-through displays may be alignable through gearwheels and/or knobs on the outside of the laser safety goggle to guarantee a good view on display. The positioning of the display apparatus may be fully motorized. In a fully motorized and automated mechanism, one might also install a camera inside the goggle for tracking the eye position and start the alignment process. A calibration method or alignment process may guarantee correct positioning of the laser safety glasses on the face and thus increases the personal safety in dangerous laser environments. A first initial setup tutorial might ensure correct positioning of the laser safety glass and the augmented reality glass. The position of the knobs and wheels may be remembered in a memory such as an electronic memory. If a user finds that the AR display is not well visible, then the position of the laser safety glass is also wrong. A recalibration of the augmented reality glass by turning the knobs and wheels may be detected by the system and an automatic positioning tutorial may be started in the goggle to ensure the correct position of the laser safety glass.

Here, while myopia and hyperopia without astigmatism may be corrected with eyepiece insertions, astigmatism or other complex illness may only be corrected with ophthalmic lenses. Thus, head-mounted AR laser safety glasses should be made compatible with prescribed glasses and should be adapted for the alignment process also for people wearing glasses. A further aspect is eye relief: This is the distance from the cornea of the eye to the surface of the first optical element. It defines the distance at which the user can obtain full viewing angles. This should be considered especially for people who wear corrective lenses or spectacles. Enabling users to adjust the eye relief may be useful for head mounted displays.

In the protective eyewear system as described above, the laser-safe head-mounted support may comprise one or more of the following camera sensors: a camera sensor with dedicated pixels for IR light detection to view the ambient and the laser light; a portable infrared and/or ultraviolet-viewing camera sensor for visualization of longer/shorter laser wavelengths, respectively; a camera sensor having an ultra-wide angle lens; a camera sensor having a wide angle lens; a bright light source; a camera sensor having a telephoto lens; a camera sensor with very high dynamic range; a portable CCD or CMOS based cameras capable of capturing x-rays; a portable hyperspectral camera; a portable laser beam profiler based on CCD or CMOS.

Here, shorter wavelength should be understood to mean a range of wavelengths being 100 nm$<\lambda<$450 nm; longer wavelengths should be understood to mean $\lambda>$750 nm.

Further, lenses may be differentiated using the field of view, FOV. In particular, ultra wide angle lenses may cover a field of view of larger than 84°, in particular 84° to 180°. For a wide angle lens, the FOV may typically cover a field of 63°-84°.

Further, the term x-ray refers to wavelengths of $10^{-12}$ m$<\lambda<10^{-8}$ M.

Further, hyperspectral imaging, like other spectral imaging, collects and processes information from across the electromagnetic spectrum. The goal of hyperspectral imaging is to obtain the spectrum for each pixel in the image of a scene, with the purpose of finding objects, identifying materials, or detecting processes.

Further, a laser beam profiler captures, displays, and records the spatial intensity profile of a laser beam at a particular plane transverse to the beam propagation path. Since there are many types of lasers—ultraviolet, visible, infrared, continuous wave, pulsed, high-power, low-power—there is an assortment of instrumentation for measuring laser beam profiles. No single laser beam profiler can handle every power level, pulse duration, repetition rate, wavelength, and beam size.

Thus, a high VLT and a representation of the surrounding in true colors may be helpful for an improved optical performance of laser safety glasses. Current commercially available laser safety eyewear not only reduce the VLT such that the scene appears darker, but also filter out the color of the surrounding. In this case, the user may even be unable to recognize important signs, lamps or alarms, even when hazardous moments occur. For these reasons, the color of lamps and alarms should change according to the laser safety glasses the personnel is using. Another safety drawback of current laser safety goggles often is that the user may not be able to see the laser beam, as the specific laser wavelength is blocked by the filter, i.e. the safety glasses. To restore color vision and to increase the VLT, different kinds of camera sensors should be used.

The RGB+IR camera may capture images of the surrounding and the laser beam and project the image into the video projection system, as described above, inside the laser safety glasses. In this way, the user may see the surroundings and the laser beam, e.g. up to a wavelength of 1100 nm, in full color and brightness. A combined RGB+IR sensor may provide the advantage that it is much more sensitive to IR radiation and it has a much higher color resolution. In particular, users working with lasers mainly in dark environment may benefit from this camera, because of its higher sensitivity in dark working areas.

Although laser safety eyewear for laser light of even longer wavelengths, e.g. >1100 nm typically have very good color representation, the human eye is not sensitive to these wavelengths. Therefore, laser beams with wavelengths >1100 nm are not seen by humans. This could represent a considerable safety risk and should be eliminated by using camera sensors with good sensitivities in these wavelength regimes.

Having multiple cameras that optionally deliver stereoscopic view to the workplace could minimize safety risks and increase productivity as well as wearing comfort.

Ultra-wide field camera may extend the limiting narrow field caused by laser safety glasses. This might increase safety, as a user may be able to better see obstacles and objects in the surrounding. It may also help to capture wide-field images for better documentation.

Switchable fixed zoom levels of cameras may be used at a workplace to read, align or simply work with finer details of the setup and or patient's tissue. Providing true optical zoom may provide major innovative advantages over state-of-the art techniques/methods. With current laser safety glasses, the user does not have a zoom and has to come closer to the object with the face. Usually this involves also coming closer to the potentially dangerous laser beam in order to fulfill the task. With a switchable optical zoom the user can be in safe distance and may still be able to perform his/her work task. Further, traditional zooming loupes, e.g. for dentists, may be problematic, as incoming laser radiation may be focused and sent through the laser safety lenses leading to a much higher stress on the safety lenses, which in turn may result in a much faster failure.

In the protective eyewear system as described above, the laser-safe head-mounted support may comprise a light detection and ranging, LIDAR, and/or a time-of-flight, ToF, unit.

In the protective eyewear system as described above, different zooms of the camera sensors may be selectable by the user so as to have different focusses.

In the protective eyewear system as described above, the laser-safe head-mounted support may be equipped with an IR light source.

An additional IR light source will increase the VLT in dark environments.

In the protective eyewear system as described above, the laser-safe head-mounted support may comprise a passive or an active cooling system attached either to the attachment system to the head or to the laser-safe head-mounted support.

While wearing traditional laser safety glasses, the heat of the human body might cause fogging of the safety lenses. Therefore, some laser safety goggles do have passive venting holes so that air circulation may take place. Fog on the laser safety lenses might disturb the normal sight as it decreases optical clarity and cause discomfort while using the safety goggles. This then might lead to a short take-off the goggle to vent it even when the laser is turned on. Combining processing units, displays and cameras as a part of augmented reality glasses with laser filter glasses might enhance the heat generation, as on top of the body there may also be some electronics producing heat. A passive cooling scheme might be sufficient. However, for some applications, passive cooling might not be enough such that it may be recommendable to use active cooling. However, using active cooling devices, e.g. small fans, might increase the weight of the system on the side of the face of the user. To balance the weight, one could attach these fans on the side or back of the head. The air would then be guided through pipes from outside to the inside of the goggles or through micro-channels.

In the protective eyewear system as described above, the passive cooling system of the laser-safe head-mounted support may comprise a heat conducting material as well as a frame having heat conducting fins, wherein the heat conducting material contacts the frame and/or the fins for heat removal.

In the protective eyewear system as described above, the active cooling system of the laser-safe head-mounted support may comprise fans placed inside the laser-safe head-mounted support or on the side or at a backside of the attachment system to the head.

In the protective eyewear system as described above, the fans may be attached to inlets, tubes or small channels to let cold air flowing from outside to inside or vice versa of the laser-safe head-mounted support.

DETAILED DESCRIPTION

Figure 1:
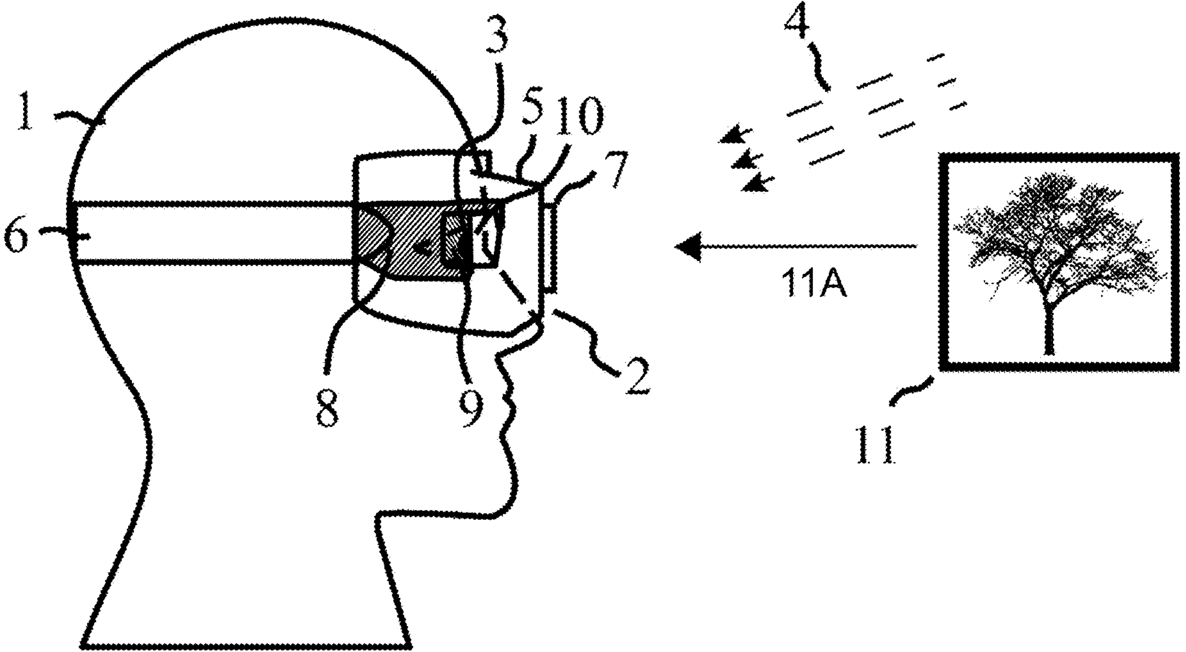
FIG. 1: illustrates a side view of a head of a user wearing a protective eyewear system for protecting of the user's eyes according to a first embodiment of the present disclosure.

FIG. 1: illustrates a side view of a head of a user wearing a protective eyewear system for protecting of the user's eyes according to a first embodiment of the present disclosure. In FIG. 1, a head of a user 1 is shown in a side view. Since FIG. 1 as well as all other FIG. 1 refer to the head of the user, this may also be shortened by just referring to "the user" unless expressly noted otherwise. Using his eyes 3, the user 1 of FIG. 1 views a real image 11. The type or content of the real image may be arbitrary. The user 1 views the real image 11 by directly facing the real image 11, which is indicated by an arrow 11A. However, viewing the real image 11 by the user 1 is hampered by harmful radiation 4, as indicated in FIG. 1. In principle, all types of ionizing radiation may be considered as being harmful. Further, high intensity radiation such as laser light or welding arc may be considered as being harmful radiation. In particular, working in optical laboratory, laser light potentially provides an ever-present danger for the eyes of the user. Thus, in FIG. 1, the user 1 wears a protective eyewear system 2 to protect his eyes 3 against harmful radiation 4. Thus, the protective eyewear system 2 in FIG. 1 is worn by the user 1 similar to wearing protective lenses. The protective eyewear system 2 further includes an attachment system 6 for attaching the protective eyewear system 2 to the head of the user 1. In other words, the protective eyewear system 2 is attached, e.g. strapped by means of the attachment system 6 to the head of the user 1.

FIG. 1 further illustrates components of the protective eyewear system 2 according to the first embodiment of the present invention. The protective eyewear system 2 includes a pair of safety lenses 7. The pair of safety lenses is sometimes also referred to as goggles. The pair of safety lenses 7 of FIG. 1 is selected to block or at least weaken the harmful radiation, mentioned above. As such, it may be that the safety lenses 7 may be exchangeable so as to select a pair of lenses particularly well suited for blocking a specific type of harmful radiation. As shown in FIG. 1, the pair of safety lenses 7 are placed at the outside of the protective eyewear system 2. Here, outside should be understood as the outermost side of the protective eyewear system 2 facing away from the face of the user 1 and facing directly the real image 11. Or, in other words, there are no further elements between the real image 11 and the pair of safety lenses 7, i.e. the light path between the real image 11 and the safety lenses 7 is not obstructed by any other element. The protective eyewear system 2 further includes a laser safe head mounted support 5 which provides for being the holding structure for holding all other elements in front of the eyes 3 of the head of the user 1. FIG. 1 further a video projection system 9 and a light guide system 10. The video projection system 9 of FIG. 1 is configured to provide a real-world image, such as the real world image 11, to the eyes of the user. In this way, the video projection system 9 comprises a light guide system 10. The light guide system 10, being part of the protective eyewear system, is to be worn so as to cover the eyes 3 of the user 1. Furthermore, FIG. 1 illustrates that the protective eyewear system 2 includes a processing element 8. The processing element 8 of FIG. 1 is configured to generate a video projection signal to be overlaid with the real image 11. For achieving this overly, the video projection signal is coupled into the light-guide system 10 of the video projection system 9. Here, the video projection signal generated by the processing element 8 is a virtual image. In this way, a virtual image may be overlaid over the real image 11.

Figure 2:
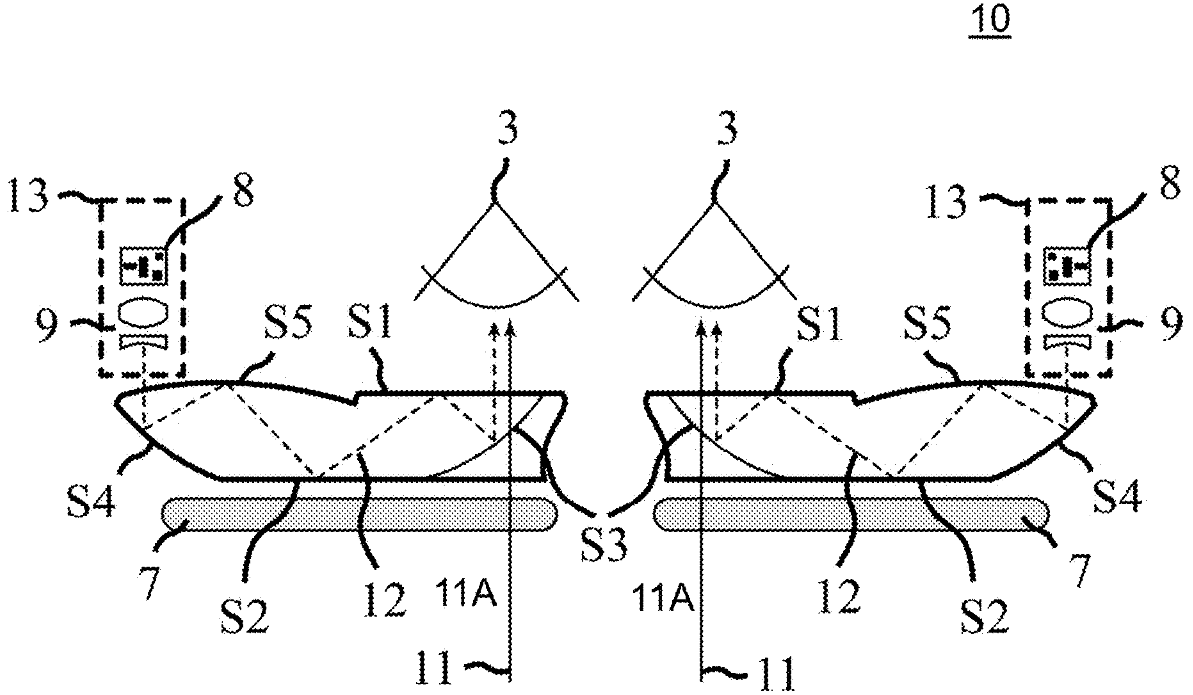
FIG. 2 illustrates a light guide system of the protective eyewear system of FIG. 1.

The protective eyewear system 2 of FIG. 1 includes further details, which are explained with respect to FIG. 2.

FIG. 2 illustrates the light guide system 10 of the protective eyewear system 2 of FIG. 1. In FIG. 2 the same reference signs are used as in FIG. 1, referring to the same elements. In FIG. 2, the light guide system 10 is illustrated having a symmetric setup for the eyes 3 of the user 1. Light corresponding to the real image 11 is incident onto the protective eyewear system 2. Specifically, said light is incident onto the safety lenses 7 as show in FIG. 2. Behind the safety lenses 7, the light guide system 10 includes at least two planar and parallel surfaces S1 and S2. Further, the light guide system 10 comprises one or more non-axial symmetric curved surfaces S3, S4, and S5. Here, it should be understood that the number of planar and parallel surfaces as well as the number of non-axial symmetric curved surfaces is not fixed to two planar and parallel surfaces as well as three non-axial symmetric curved surfaces. This number may be higher according to application needs. In addition, as indicated in FIG. 2, the video projection system 9 with its processing element 8 also includes a light guide member consisting of surfaces that face each other. Thus, the video projection signal, i.e. virtual image, generated by the processing element 8 is coupled into the set of surfaces S1, S2 . . . S5 and eventually provided as overlap to the eyes 3 of the user 1. These surfaces S1, S2 may be flat and parallel to each other to eliminate unwanted diopter. Using a light guide and a display design that eliminates diopter may also be important for laser safety, or protection against harmful radiation.

Furthermore, surfaces such as the surface S3 of FIG. 0.2 may be semi-transparent surfaces with respect to visible light. A semi-transparent reflective surface such as the surface S3 for visible light may provide that the video projection signal 12 and the real-world image 11 can be overlapped and can be displayed directly to the eyes 3 of the user 1 when wearing the protective eyewear system. The semi-transparent reflective surface S3 may also be referred to as a half-mirror S3.

Furthermore, the light guide system 10 of the protective eyewear system 2 of FIG. 2 may further include at least one semi-transparent reflective surface S3, wherein the opacity of the half-mirror S3 is electrically adaptable to a contrast between video projection signal 12 and light conditions of ambient light and/or the harmful radiation 4.

Figure 3:
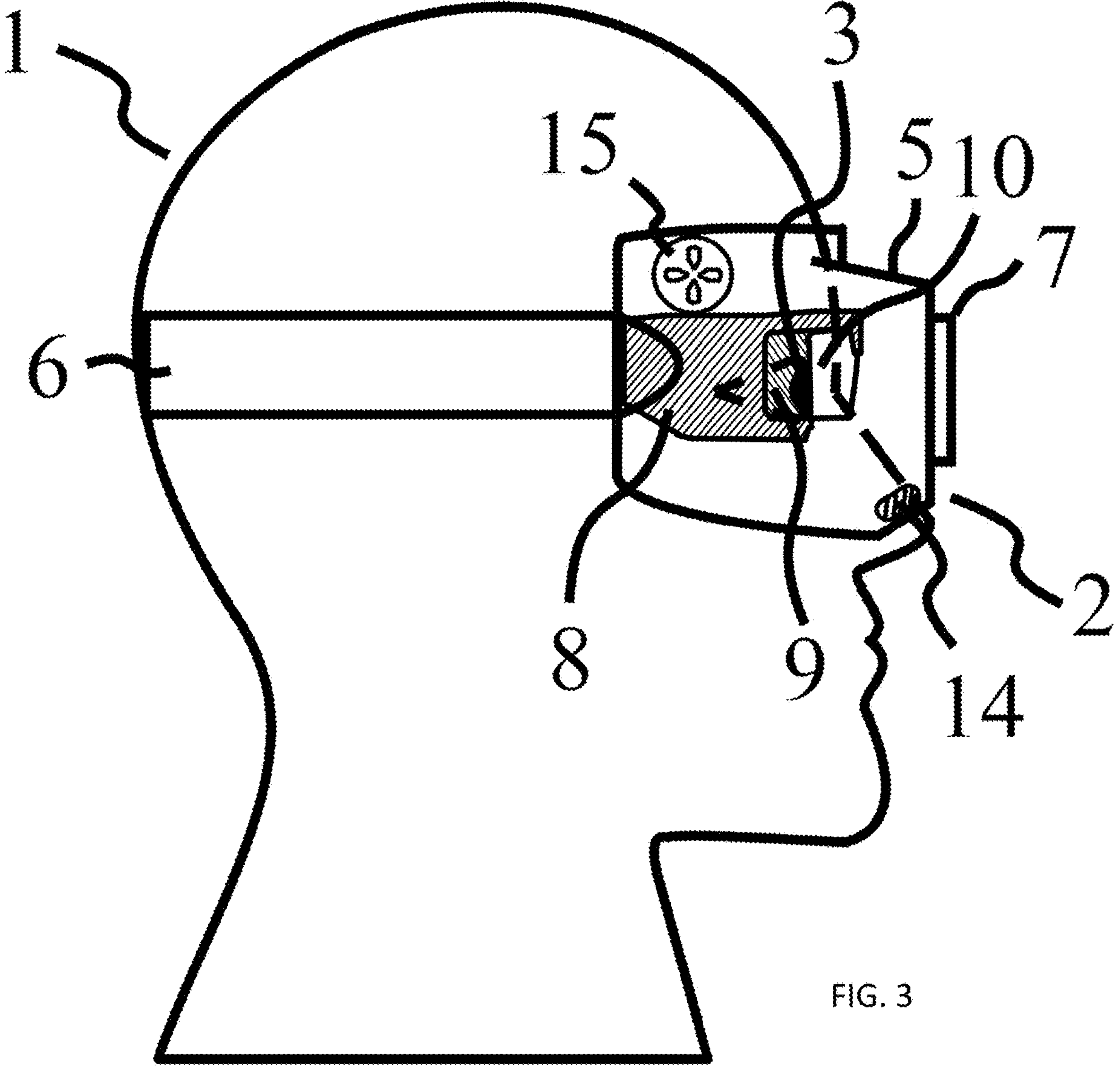
FIG. 3 illustrates a side view of a head of a user wearing a protective eyewear system for protecting of the user's eyes according to a second embodiment of the present disclosure.

FIG. 3 illustrates a side view of a head of a user wearing a protective eyewear system for protecting of the user's eyes according to a second embodiment of the present disclosure. The elements shown in FIG. 3 have the same reference signs as FIGS. 1 and 2, respectively. These will not be explained, again. In that sense, FIG. 3 may be viewed as an addition or enhancement of the embodiment shown in FIGS. 1 and 2. In FIG. 3, the user wears the protective eyewear system 2 strapped to his head so as to cover his eyes 3 when viewing a real world image (not shown again). The protective eyewear system 2 of FIG. 3 further includes a brightness sensor 14, which is placed within the laser-safe head-mounted support 5. The brightness sensor 14 of FIG. 3 may be configured to regulate the opacity of the at least one semi-transparent reflective surface S3. This may be done automatically. Furthermore, FIG. 3 illustrates element 15, representing knobs and wheels for alignment of optics.

Here, it should be noticed that different laser filter glasses might have different VLT. Thus, the brightness inside 14 the laser goggle might change. To adapt to different VLT, a brightness sensor 14 placed inside the laser safety goggle to monitor VLT may serve to adjust the brightness of the video projection system. The brightness sensor 14 might also change the color temperature of the video projection system to shorter wavelengths, as in dark environments the eyes 3 of the user 1 may be more sensitive in this spectral region.

Figure 4:
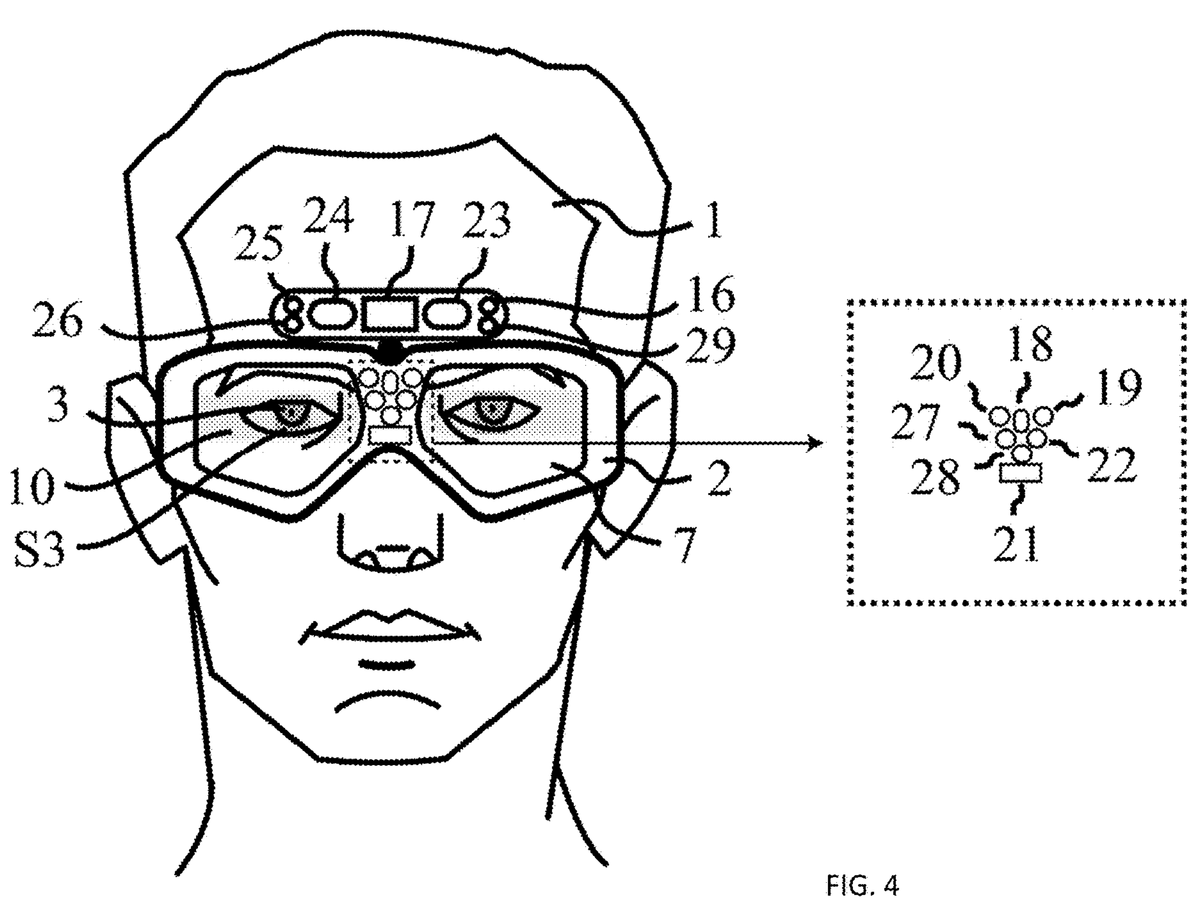
FIG. 4 illustrates a front view, i.e. facial view, of a head of a user wearing a protective eyewear system for protecting of the user's eyes including further enhancements of the first and second embodiment of the present disclosure.

FIG. 4 illustrates a front view, i.e. facial view, of a head of a user 1 wearing a protective eyewear system 2 for protecting of the user's eyes 3. Here, same elements as shown in FIGS. 1-3 are denoted by same reference signs and will not be explained, again. FIG. 4 illustrates further enhancements over the first and second embodiment of the present disclosure. Again, these enhancements may be freely combined or included into the embodiments of FIGS. 1-3.

Specifically, FIG. 4 illustrates that the laser-safe head-mounted support 5 of the protective eyewear system 2 may include one or more of specific camera sensors. These specific camera sensors may be one or more of a camera sensor with dedicated pixels for infrared, IR, 16 light detection to view the ambient and the laser light. In other word, element 16 is an IR camera sensor/detector. The laser-safe head-mounted support 5 of FIG. 4 further may include one or more of a portable infrared and/or ultraviolet-viewing camera sensor 17 for visualization of longer/shorter laser wavelengths, respectively. The laser-safe head-mounted support 5 of FIG. 4 further may include a camera sensor having an ultra-wide angle lens 18. The laser-safe head-mounted support 5 of FIG. 4 further may include one or more of a camera sensor having a wide-angle lens 19. The laser-safe head-mounted support 5 of FIG. 4 further may include one or more of a bright light source, e.g. LEDs, 20. The laser-safe head-mounted support 5 of FIG. 4 further may include one or more of a camera sensor having a telephoto lens 21. The laser-safe head-mounted support 5 of FIG. 4 further may include one or more of a camera sensor with very high dynamic range 22. The laser-safe head-mounted support 5 of FIG. 4 further may include one or more of a portable CCD or CMOS based cameras capable of capturing x-rays 23. The laser-safe head-mounted support 5 of FIG. 4 further may include one or more of a portable hyperspectral camera 24. The laser-safe head-mounted support 5 of FIG. 4 further may include one or more of a portable laser beam profiler based on CCD or CMOS 26.

Figure 7:
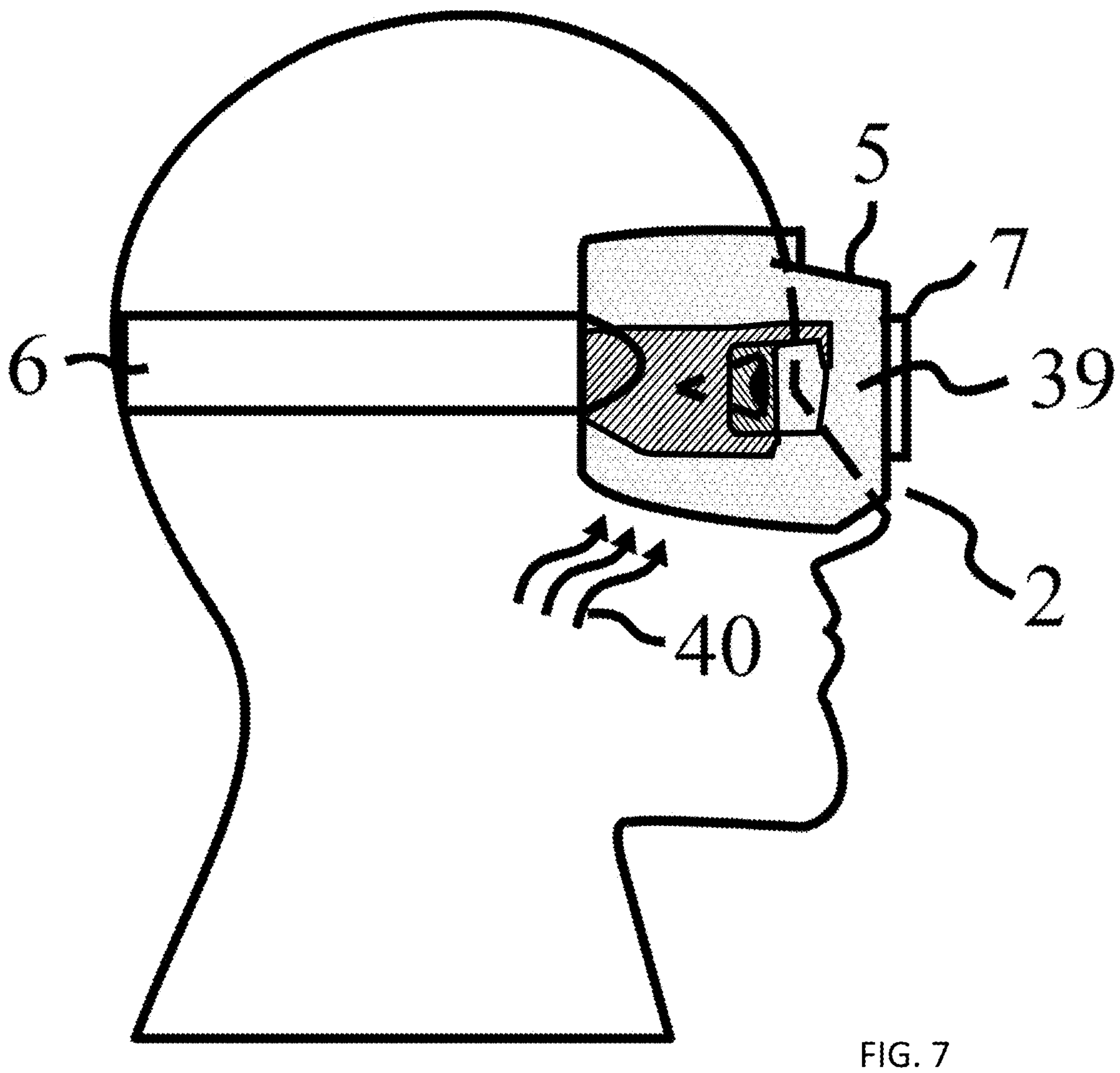
FIG. 7 illustrates a particular aspect of the laser-safe head-mounted support according to the present disclosure.
Figure 8:
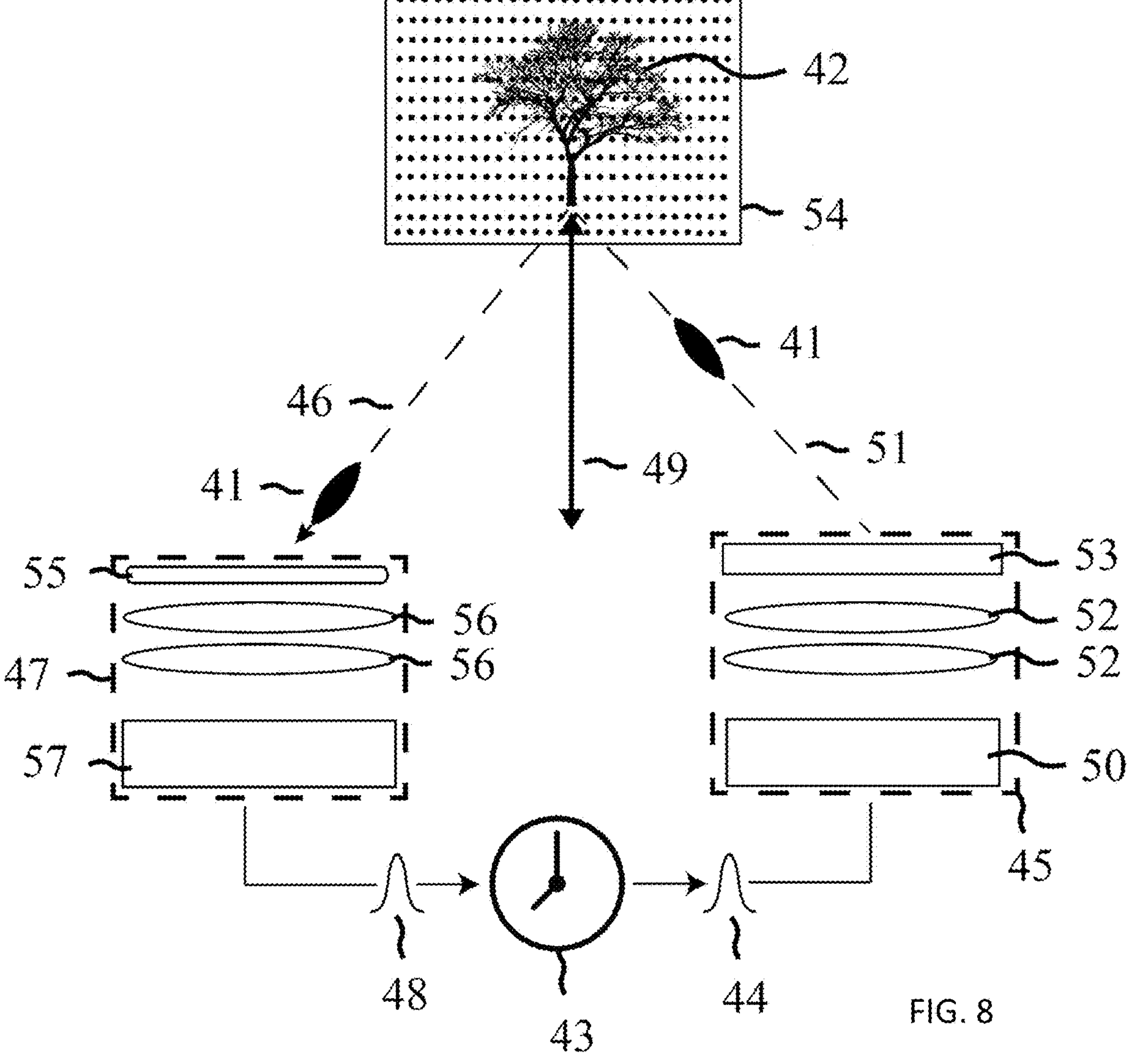
FIG. 8 illustrates compact LIDAR sensor incorporated into the digital laser safety glasses according to the present disclosure

In addition, in the magnified part of FIG. 4 it is illustrated that the laser-safe head-mounted support 5 of FIG. 4 further may include a LIDAR 27 and/or a TOF 28, both of which will be further detailed with respect to FIGS. 7 and 8. The laser-safe head-mounted support 5 of FIG. 4 further may include an IR light source 29.

Here, the laser beam profiler 26 may capture, display, and record the spatial intensity profile of a laser beam at a particular plane transverse to the beam propagation path. Since there are many types of lasers—ultraviolet, visible, infrared, continuous wave, pulsed, high-power, low-power—there may be an assortment of instrumentation for measuring laser beam profiles. No single laser beam profiler can handle every power level, pulse duration, repetition rate, wavelength, and beam size.

Furthermore, to restore color vision and to increase the VLT, different kinds of camera sensors should be used.

In particular, an RGB+IR camera may capture images of the surrounding and the laser beam and project the image into the video projection system, as described above, inside the laser safety glasses. In this way, the user may see the surroundings and the laser beam, e.g. up to a wavelength of 1100 nm, in full color and brightness. A combined RGB+IR sensor may provide the advantage that it is much more sensitive to IR radiation and it has a much higher color resolution. In particular, users working with lasers mainly in dark environment may benefit from this camera, because of its higher sensitivity in dark working areas.

Although laser safety eyewear for laser light of even longer wavelengths, e.g. >1100 nm typically have very good color representation, the human eye is not sensitive to these wavelengths. Therefore, laser beams with wavelengths >1100 nm are not seen by humans. This could represent a considerable safety risk and should be eliminated by using camera sensors with good sensitivities in these wavelength regimes.

Having multiple cameras that optionally deliver stereoscopic view to the workplace could minimize safety risks and increase productivity as well as wearing comfort.

Ultra-wide field camera may extend the limiting narrow field caused by laser safety glasses. This might increase safety, as a user may be able to better see obstacles and objects in the surrounding. It may also help to capture wide-field images for better documentation.

Switchable fixed zoom levels of cameras may be used at a workplace to read, align or simply work with finer details of the setup and or patient's tissue. Providing true optical zoom may provide major innovative advantages over state-of-the art techniques/methods. With current laser safety glasses, the user does not have a zoom and has to come closer to the object with the face. Usually this involves also coming closer to the potentially dangerous laser beam in order to fulfill the task. With a switchable optical zoom the user can be in safe distance and may still be able to perform his/her work task. Further, traditional zooming loupes, e.g. for dentists, may be problematic, as incoming laser radiation may be focused and sent through the laser safety lenses leading to a much higher stress on the safety lenses, which in turn may result in a much faster failure.

Figure 5:
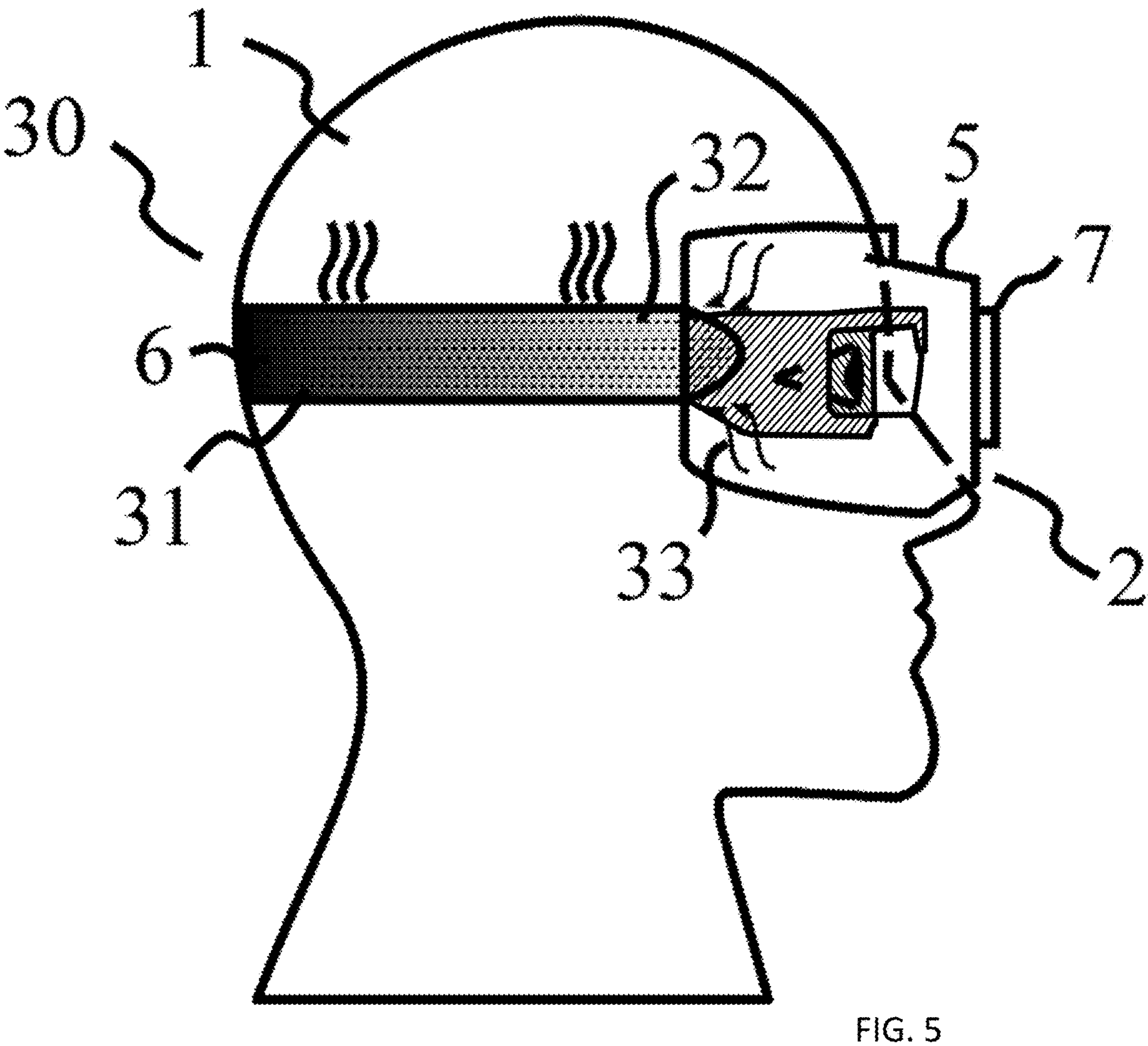
FIG. 5 illustrates another side view of a head of a user wearing a protective eyewear system for protecting of the user's eyes according to the first or second embodiment of the present disclosure.

FIG. 5 illustrates another side view of a head of a user wearing a protective eyewear system for protecting of the user's eyes according to the first or second embodiment of the present disclosure. Here, same elements as shown in FIGS. 1-4 are denoted by same reference signs and will not be explained, again. FIG. 5 thus illustrates further enhancements over the previous embodiments of the present disclosure. Specifically, FIG. 5 illustrates a passive cooling system 30, heat-conducting material 31, a frame with heat conducting fins 32 for heat removal 33. While wearing laser safety glasses, the heat of the human body might cause fogging of the safety lenses. Therefore, some laser safety goggles include passive venting holes so that air circulation may take place. Some manufacturers also offer anti-fogging sprays for the laser safety goggles. However, neither solutions are long lasting. Fog on the laser safety lenses might disturb the normal sight as it decreases optical clarity and cause discomfort while using the safety goggles. This then might lead to a short take-off the goggle to vent it even when the laser is turned on. Combining processing units, displays and cameras as a part of augmented reality glasses with laser filter glasses might enhance the heat generation, as on top of the body there may also be some electronics producing heat. A passive cooling scheme might be sufficient. However, for some applications, passive cooling might not be enough such that it may be recommendable to use active cooling. However, using active cooling devices, e.g. small fans, might increase the weight of the system on the side of the face of the user. To balance the weight, one could attach these fans on the side or back of the head. The air would then be guided through pipes from outside to the inside of the goggles or through micro-channels. This is further illustrated in FIG. 6, which illustrates and active cooling system.

Figure 6:
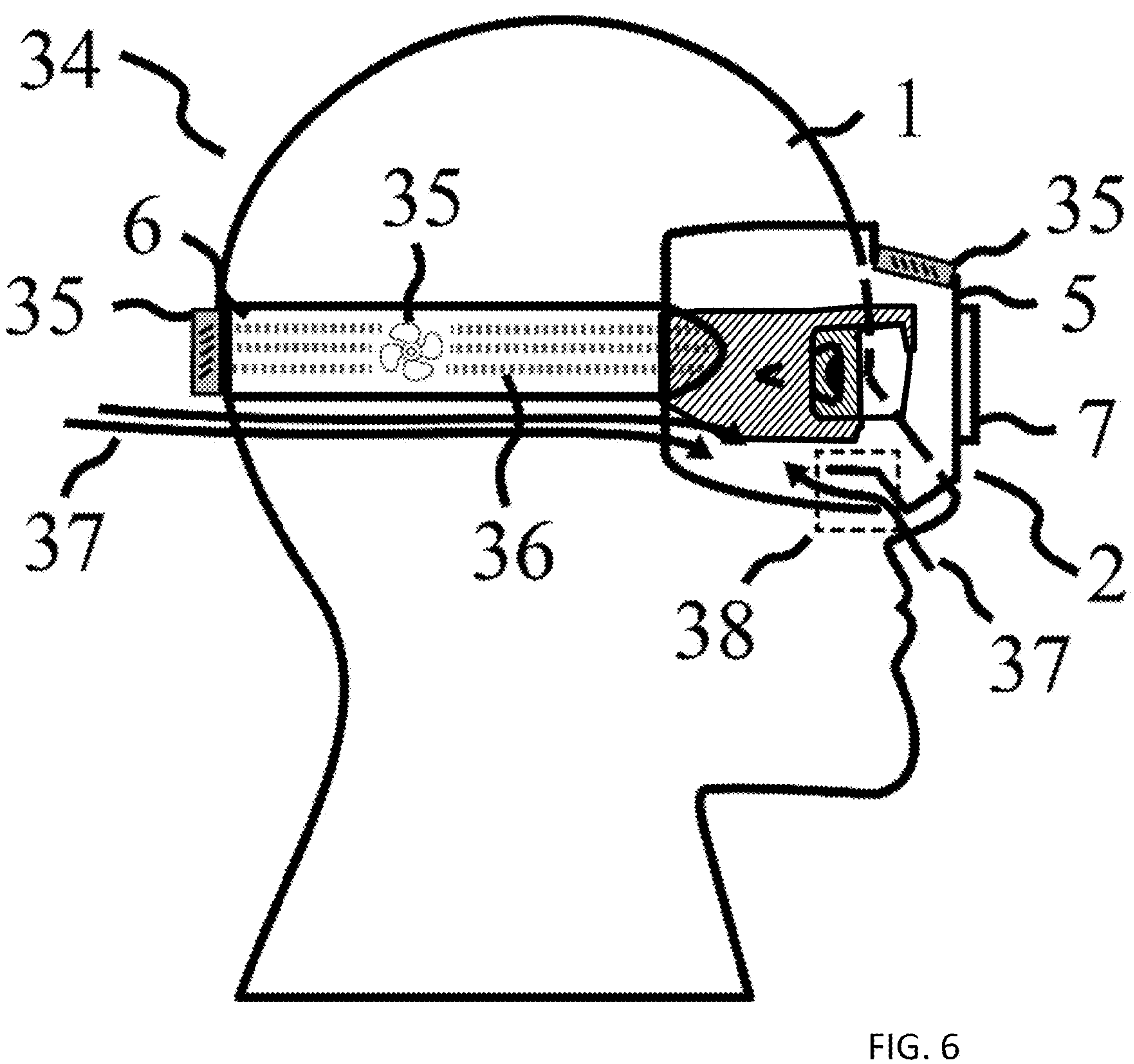
FIG. 6 illustrates another side view of a head of a user wearing a protective eyewear system for protecting of the user's eyes according to the first or second embodiment of the present disclosure.

In FIG. 6, again, same elements as shown in FIGS. 1-5 are denoted by same reference signs and will not be explained. In FIG. 6, the protective eyewear system 2, the active cooling system 34 of the laser-safe head-mounted support 5 may comprise fans 35 placed inside the laser-safe head-mounted support 5 or on the side or at a backside of the attachment system 6 to the head of the user 1. Here, the "side" refers to the side of the head, i.e. neither the face nor the back of the head of the user but a region near the user's ears, respectively. FIG. 6 explicitly shows inlets, tubes or small channels 36. FIG. 6 also illustrates air streaming inside 37 of the laser-safe head-mounted support. FIG. 6 further illustrates a light-proof laser-safe inlet mechanism 38. Thus, in the protective eyewear system 2 as described above, the fans 35 may be attached to inlets, tubes or small channels 36 to let cold air flowing from outside to inside 37 or vice versa of the laser-safe head-mounted support, so as to provide a venting, cooling and/or drying effect.

FIG. 7 illustrates that the laser-safe head-mounted support 4 has a porous foam structure 38 that is impermeable for harmful radiations, e.g. direct and stray laser light, 3, liquids and any other dangerous solid particles but permeable for air and sound. Through air convection 39, this structure will act as a cooling element for the entire protective eyewear system 2. In particular, the porous structure can be produced via additive manufacturing methods, e.g. 3D printing.

FIG. 8 illustrates a compact LIDAR sensor incorporated into the digital laser safety glasses, as described in the present disclosure.

In general, miniaturized, head-worn LIDAR, light detection and ranging, sensors 27 included into laser-safety goggles as described in the present disclosure may provide many advantages for the users:

One effect is that 3D scans of objects, scenes and people may be provided with much higher precision than with conventional cameras combined with image recognition.

As an example application: Laser alignment is known to be a very crucial and position sensitive work. Even small tilts or lateral displacements of a mirror may lead to a huge displacement of the laser beam. The digital laser safety goggle presented in the present disclosure can detect the mirror position and tilt with great accuracy with a LIDAR sensor. The read-out of this position can then be used to compute the path of the laser beam and predict the point of impact of the laser beam. The software might then also suggest how to tune the mirror to guide the laser beam to the desired point.

Another effect is that a much more precise scene recognition, see above, provides a much more precise projection of augmented reality content.

Another effect is that a much better focus for conventional cameras may be provided, even in low-light conditions.

In low light conditions, which are very common in laser labs, it is very difficult to have a good and fast adaptation of the camera-focus. However, a LIDAR sensor may help here, as it is almost independent of the light conditions of the scene. The LIDAR sensor may measure the distance to objects much more precisely and the conventional camera can adapt its focus.

Referring to FIG. 8, the LIDAR sensor 27 used in the protective eyewear system 2 described in the present disclosure should be wearable and thus compact and energy-efficient. One possible realization scheme is shown schematically in FIG. 8. In FIG. 8, a pulsed laser 41 is used to measure the distance to an arbitrary object 42. In FIG. 8, a digital clock 43 starts to count and sends out an electronic signal 44 to the laser 45, which then emits the pulse 41. When the reflected laser light 46 hits a detector 47, the generated electronic signal 48 stops the clock 43. The time-of-flight can be used to calculate the distance 49 to the object 42. This is often referred to direct time-of-flight measurement principle.

FIG. 8 thus illustrates a compact LIDAR sensor incorporated into the digital laser safety glasses, as described in the present disclosure. For example, one may use one or an array of VCSELs, vertical-cavity surface-emitting laser, 50 to generate pulsed light, e.g. typically nanoseconds, 41. The laser beam 51 is then shaped via some projection optics 52; cf. FIG. 8, such that the light finally reaches a diffractive optical element, DOE, 53. Here the DOE 53 may be designed in such a way that it generates multiple laser spots projected into the ambient room/space 54. Assuming the application takes place inside a room, surfaces inside the room may serve as scatterers or reflectors. Thus, from surfaces inside this room, the above-mentioned laser spots may be reflected and may then impinge onto a detection unit 47 closely placed to the laser unit 45. The detection system may have a filter 55 to remove unwanted ambient wavelengths and also an appropriate projection optics 56 to guide the incoming reflected light onto the detector chip 57. In order to have better detection sensitivity single-photon avalanche diodes SPADs can be implemented.

The present disclosure refers to the following terminology:

Video projection system/device: a display with some optics that generates virtual images to be displayed to the eye of the user.

Light guide or light guide system: Light guides are used to distribute light from the source to a particular area that requires illumination. They are made up of a transparent material, e.g. glass or plastic material, and thin filaments and are capable of transmitting light signals though internal reflections.

Head-mounted support: a band or basket that is attached to the head to hold the glasses frame.

Processing element/unit: the part of a computer that performs logical and arithmetical operations on the data as specified in the instructions.

Optical system: a bunch of optics, e.g. lenses, mirrors, prisms, assembled to perform a certain optical function.

Projection optics/video projection system: an optical system that guides the light from a display to the light guide.

Telephoto camera: A telephoto lens is a type of camera lens designed for taking photographs of subjects at moderate to far distances. Also known as a "tele lens" or "long lens", they are a type of long-focus lens which use a special internal construction to give them a focal length much longer than the length of the lens itself.

Brightness sensor: An integrated brightness sensor permanently monitors ambient light and automatically adjusts the screen's brightness.

LIST OF REFERENCE SIGNS

1 (head of a) user
2. Protective eyewear system for protection of the eyes
3 eyes of the user
4. harmful radiation
5. laser-safe head-mounted support
6. attachment system to the head
7. pair of safety lenses
8. processing element
9. video projection system
10. light guide system
11. real image
11A arrow
12. video projection signal;
13 whole system
14. brightness sensor
15. adjustment knobs and wheels
16. camera sensor with dedicated pixels for IR light detection
17. portable infrared and/or ultraviolet-viewing camera sensor
18. camera sensor having an ultra-wide angle lens
19. camera sensor having a wide-angle lens
20. bright light source
21. camera sensor having a telephoto lens
22. camera sensor with very high dynamic range
23 portable CCD or CMOS based camera capable of capturing x-rays
24. portable hyperspectral camera
26 portable laser beam profiler based on CCD or CMOS
27 LIDAR
28 TOF
29 IR light source
30 passive cooling system
31 heat conducting material
32 frame with heat conducting fins
33 heat removal
34 active cooling system
35 fans
36 inlets, tubes or small channels
37 inside of the laser-safe head-mounted support
38 laser-safe inlet mechanism
39 porous foam structure
40 air convection
41 pulsed laser
42 arbitrary object
43 digital clock
44 electronic signal
45 laser
46 reflected laser light
47 detector/detection unit
48 generated electronic signal
49 distance
50 vertical-cavity surface-emitting laser, VCSEL,
51 laser beam
52 projection optics
53 diffractive optical element, DOE
54 ambient room/space
55 filter
56 projection optics
57 detector chip
S1, S2 planar and parallel surfaces
S3, S4, S5 non-axial symmetric curved surfaces

The invention claimed is:

1. Protective eyewear system for protection of the eyes of a user against harmful radiation, comprising:

a laser-safe head-mounted support with an attachment system to the head;

a pair of safety lenses selected to block or weaken the harmful radiation, said pair of safety lenses being attached to or included in the laser-safe head-mounted support;

a processing element, the laser-safe head-mounted support comprising said processing element, the processing element being configured to generate a video projection signal;

a video projection system configured to provide a real image;

a light guide system to be worn so as to cover the eyes of the user;

the processing element configured to generate a video projection signal to be overlaid with the real image, the video projection signal is coupled into the light-guide system;

wherein the light guide system comprises at least two planar and parallel surfaces, and wherein at least one selected from the group consisting of the light guide system and the video projection system comprise one or more non-axial symmetric curved surfaces;

wherein the light guide system is separate from the video projection system;

wherein the harmful radiation comprises laser-generated welding arc and/or x-ray.

2. The protective eyewear system according to claim 1, wherein the light guide system includes a semi-transparent reflective surface for visible light such that the video projection signal and the real image can be overlapped and displayed directly to the eyes of the user when wearing the protective eyewear system.

3. The protective eyewear system according to claim 1, wherein the light guide system further includes at least one semi-transparent reflective surface, wherein the semi-transparent reflective surface is a half-mirror, wherein the opacity of the half-mirror is electrically adaptable to a contrast between video projection signal and light conditions of at least one selected from the group consisting of ambient light and the harmful radiation.

4. The protective eyewear system according to claim 3, wherein a brightness sensor is placed within the laser-safe head-mounted support in order to regulate the opacity of the at least one semi-transparent reflective surface.

5. The protective eyewear system according to claim 4, wherein the brightness sensor is configured to regulate the illumination of the video projection signal displayed to the eyes and to control the color temperature of the video projection system.

6. The protective eyewear system according to claim 5, wherein the at least one semi-transparent reflective surface is configured to act as a neutral density filter.

7. The protective eyewear system according to claim 4, wherein the at least one semi-transparent reflective surface is configured to act as a neutral density filter.

8. The protective eyewear system according to claim 3, wherein the at least one semi-transparent reflective surface is configured to act as a neutral density filter.

9. The protective eyewear system according to claim 1, wherein the position of the light guide system, processing element as well as the video projection system as a whole system can be aligned with respect to the user's eye.

10. The protective eyewear system according to claim 1, wherein the laser-safe head-mounted support comprises one or more of the following camera sensors:

a camera sensor with dedicated pixels for IR light detection to view the ambient and the laser light;

a portable camera sensor, the camera sensor being at least one selected from the group consisting of infrared for visualization of longer laser wavelengths and ultraviolet-viewing for visualization of shorter laser wavelengths;

a camera sensor having an ultra-wide angle lens;

a camera sensor having a wide angle lens;

a bright light source;

a camera sensor having a telephoto lens;

a camera sensor with very high dynamic range;

a portable CCD or CMOS based camera capable of capturing x-rays;

a portable hyperspectral camera; and a portable laser beam profiler based on CCD or CMOS.

11. The protective eyewear system according to claim 10, wherein different zooms of the camera sensors are selectable by the user so as to have different focuses.

12. The protective eyewear system according to claim 11, wherein the laser-safe head-mounted support is equipped with an IR light source.

13. The protective eyewear system according to claim 10, wherein the laser-safe head-mounted support is equipped with an IR light source.

14. The protective eyewear system according to claim 1, wherein the laser-safe head-mounted support comprises at least one selected from the group consisting of a light detection and ranging, LIDAR and a time-of-flight, ToF, unit.

15. The protective eyewear system according to claim 1, wherein the laser-safe head-mounted support comprises a passive or an active cooling system attached either to the attachment system to the head or to the laser-safe head-mounted support.

16. The protective eyewear system according to claim 15, wherein the passive cooling system of the laser-safe head-mounted support comprises a heat conducting material as well as a frame having heat conducting fins, wherein the heat conducting material contacts at least one selected from the group consisting of the frame and the fins for heat removal.

17. The protective eyewear system according to claim 15, wherein the active cooling system of the laser-safe head-mounted support comprises fans placed inside the laser-safe head-mounted support or on the side or at a backside of the attachment system to the head.

18. The protective eyewear system according to claim 17, wherein the fans are attached to inlets, tubes or small channels to let cold air flowing from outside to inside or vice versa of the laser-safe head-mounted support.

19. The protective eyewear system according to claim 1, wherein the light guide system further includes at least one semi-transparent reflective surface, wherein the semi-transparent reflective surface is a half-mirror, wherein the opacity of the half-mirror is electrically adaptable to a contrast between video projection signal and light conditions of at least one selected from the group consisting of ambient light and the harmful radiation.

* * * * *